(12) United States Patent
Chen et al.

(10) Patent No.: US 11,621,978 B2
(45) Date of Patent: *Apr. 4, 2023

(54) TEMPORARY INTERFACE TO PROVIDE INTELLIGENT APPLICATION ACCESS

(71) Applicant: International Business Machines Corporation, Armonk, NY (US)

(72) Inventors: Dong Chen, Beijing (CN); Wu Mi Zhong, Beijing (CN); Ting Yin, Beijing (CN); Zhi Li Guan, Beijing (CN); Yang Liang, Beijing (CN); Shao Jun Ding, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/850,215

(22) Filed: Dec. 21, 2017

(65) Prior Publication Data

US 2019/0199750 A1 Jun. 27, 2019

(51) Int. Cl.
*H04L 9/40* (2022.01)
*G06F 21/31* (2013.01)
(Continued)

(52) U.S. Cl.
CPC .............. *H04L 63/20* (2013.01); *G06F 21/31* (2013.01); *G06F 21/53* (2013.01);
(Continued)

(58) Field of Classification Search
CPC ......... H04L 63/20; H04L 63/10; H04L 41/22; H04L 63/102; G06F 21/53; G06F 21/6218; G06F 21/31
See application file for complete search history.

(56) References Cited

U.S. PATENT DOCUMENTS 7,508,767 B2    3/2009   Shinomiya
8,955,082 B2    2/2015   Mazur et al.
(Continued)

OTHER PUBLICATIONS

Beresford, A. R., Rice, A., & Skehin, N. (Mar. 1, 2011). MockDroid: trading privacy for application functionality on smartphones. Retrieved from https://www.cl.cam.ac.uk/~acr31/pubs/beresford-mockdroid.pdf (Year: 2011).*

(Continued)

*Primary Examiner* — Syed A Zaidi
*Assistant Examiner* — Syed M Ahsan
(74) *Attorney, Agent, or Firm* — Scott Dobson, Esq.; Rachel L. Pearlman, Esq.; Heslin Rothenberg Farley & Mesiti P.C (57) ABSTRACT

A method, computer program product, and system includes a processor(s) obtaining an authorization failure from a target application because an access request was denied based on insufficient permissions of a user. The processor(s) institutes a mock interface with a visual appearance of the target application. The mock interface displays predefined data and the target application displays dynamic data, from the server(s) executing the target application. The processor(s) obtains, via the mock interface, a request to change the permissions of the user to the target application, which includes a selection, by the user, through the mock interface, of one or more individual permissions displayed in the mock interface. The processor(s) automatically generates a customized security policy comprising the selection, where based on applying the customized security policy, repeating the access request results in authorized access to the target application.

4 Claims, 9 Drawing Sheets

(51) Int. Cl.
 H04L 41/22 (2022.01)
 G06F 21/53 (2013.01)
 G06F 21/62 (2013.01)
(52) U.S. Cl.
 CPC .......... *G06F 21/6218* (2013.01); *H04L 41/22* (2013.01); *H04L 63/10* (2013.01)

(56) References Cited

U.S. PATENT DOCUMENTS

| | | |
|---|---|---|
| 2011/0145932 A1 | 6/2011 | Nerger et al. |
| 2016/0042191 A1 | 2/2016 | Enck et al. |
| 2016/0246992 A1* | 8/2016 | Brutschy ............. G06F 21/6245 |
| 2017/0300402 A1* | 10/2017 | Hoffner ............... G06F 11/3664 |
| 2018/0309748 A1* | 10/2018 | Li ....................... H04L 63/0815 |

OTHER PUBLICATIONS

Alastair R. Beresford, Andrew Rice, Nicholas Skehin, and Ripduman Sohan. 2011. MockDroid: trading privacy for application functionality on smartphones. In Proceedings of the 12th Workshop on Mobile Computing Systems and Applications (HotMobile '11) DOI:https://doi.org/10.1145/2184489.2184500 (Year: 2011).*
https://doi.org/10.1145/2184489.2184500 (Year: 2011).*
Beresford et al., "MockDroid: trading privacy for application functionality on smartphones", Dated Mar. 2011 (Year: 2011).*
Mell et al., "The NIST Definition of Cloud Computing", National Institute of Standards and Technology, U.S. Dept. of Commerce, NIST Special Publ. 800-145, Sep. 2011, 7 pages.
List of IBM Patents or Patent Applications Treated as Related, Jul. 23, 2019, 2 pages.

* cited by examiner

TEMPORARY INTERFACE TO PROVIDE INTELLIGENT APPLICATION ACCESS

BACKGROUND

As crucial business systems are increasingly computerized, an essential element to setting up a new employee such that the employee can be productive includes providing this employee with access to all systems and assets required for the employee to do his or her job. Changes in access may also occur for an existing employee, when the employee changes roles within an organization, including joining a new project team. The ability of an employee to be productive in a new rile quickly can be negatively impacted by the complexities of determining what systems and assets the individual should have permission to access. In certain situations, the processes to establish access for an employee can be time consuming. Delays can impact productivity of the employee as well as of the team and/or organization that the employee in a part of.

SUMMARY

Shortcomings of the prior art are overcome and additional advantages are provided through the provision of a method for updating permissions for a user to a target application. The method includes, for instance: obtaining, by one or more processors, an authorization failure from a target application, wherein the authorization failure indicates that an access request to the target application was denied based on insufficient permissions of a user associated with the request; instituting, by the one or more processors, a mock interface, wherein a visual appearance of the mock interface simulates a visual appearance of the target application, wherein the mock interface displays predefined data and the target application displays dynamic data, from one or more server executing the target application; obtaining, by the one or more processors, via the mock interface, a request to change the permissions of the user to the target application, wherein the request comprises a selection, by the user, through the mock interface, of one or more individual permissions displayed in the mock interface; and automatically generating, by the one or more processors, a customized security policy comprising the selection, wherein based on applying the customized security policy, repeating the access request results in authorized access to the target application.

Shortcomings of the prior art are overcome and additional advantages are provided through the provision of a computer program product for updating the permissions of a user to access a target application. The computer program product comprises a storage medium readable by a processing circuit and storing instructions for execution by the processing circuit for performing a method. The method includes, for instance: obtaining, by the one or more processors, an authorization failure from a target application, wherein the authorization failure indicates that an access request to the target application was denied based on insufficient permissions of a user associated with the request; instituting, by the one or more processors, a mock interface, wherein a visual appearance of the mock interface simulates a visual appearance of the target application, wherein the mock interface displays predefined data and the target application displays dynamic data, from one or more server executing the target application; obtaining, by the one or more processors, via the mock interface, a request to change the permissions of the user to the target application, wherein the request comprises a selection, by the user, through the mock interface, of one or more individual permissions displayed in the mock interface; and automatically generating, by the one or more processors, a customized security policy comprising the selection, wherein based on applying the customized security policy, repeating the access request results in authorized access to the target application.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
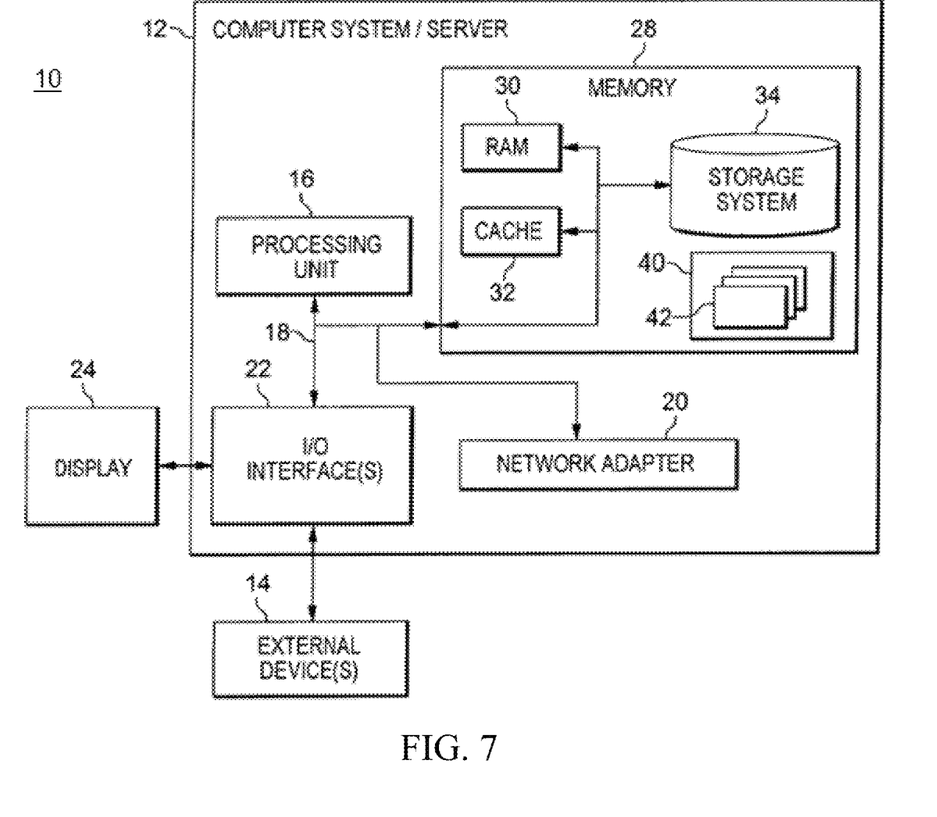
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a computer-implemented method, a computer program product, and a computer system that include one or more programs that enable a user, who has not been authorized through regular permissioning channels (e.g., a new employee, an employee who has begun a new role) to view/navigate/update permission to a target system, based on being rejected from accessing the system. Contemporaneously with being rejected access to an asset (e.g., based on an authorization failure), the one or more programs generate a user interface (e.g., a mock interface, a simulated service, an application programming interface (API), etc.), which the user can utilize to apply for a permission to the target system. The one or more programs generate a user interface that enable the user to configure a permission request by one or more of viewing, navigating, and updating the user's existing permission to the target system. Upon receiving a finalized permission request via the user interface, the one or more programs export the permission request as a customized policy and transmits the customized policy as a permission request to the target system. Based on receiving the customized policy, the target system may update the user's permissions to enable the user to access the asset, as requested.

Embodiments of the present invention are inextricably linked to computing because one or more programs in embodiments of the present invention enable the acquisition of application information and authorization to access a given application from a point of entry in a system that may not control the rights of the application. By providing a user interface responsive to a failed authorization, embodiments of the present invention enable one or more programs in a computing system to obtain and resolve permissioning issues, in real-time. Thus, embodiments of the present invention protect the security and integrity of resources, while simplifying the acquisition of permissions of by user who had their attempts to access to resources (arguably) erroneously denied because existing permissioning system and procedures are unable to accommodate the real-time needs of the users.

In embodiments of the present invention, one or more programs not only provide a user or a process with an opportunity to access a resource to which the user and/or process was earlier denied access, immediately after the denial, the one or more programs additionally provide the user and/or process with a detailed view of permissions associated with the resource, as well as the permissions assigned to the user and/or process, so that the subsequent permission request generated by the one or more programs to the target system controlling permissions to the resource, is relevant to the requirements of the user and/or process, adding further efficiency to authorization controls within the computing environment.

Aspects of some embodiments of the present invention provide advantages over existing systems of managing resource-related authorizations in a multi-user shared computing environment, including but not limited to, a cloud computing environment. As aforementioned, one or more programs provide a real-time method of addressing authorization issues by generating a user interface (e.g., temporary interface, simulated service, API, etc.) in response to an authorization failure, wherein an entity may utilize the interface to view information related to the application and to configure a template that the one or more programs may utilize as a foundation for a request for access to the application. For example, the one or more programs may generate and apply a security policy, based on permissions configured/selected by the user.

Advantages of embodiments of the present invention over existing systems include providing users with transparency regarding an authorization failure, without compromising the security of the application or the environment as a whole. For example, in some embodiments of the present invention, the one or more programs generate an interface that enables a user, after failing to be authorized for access to an application, to access certain of the application data and/or mock data that is similar enough to the application data that the user can view a simulation of the application pages. The one or more programs provide this access to the user by assigning the user a temporary identifier to use when accessing the interface. In some embodiments of the present invention, once the user is authorized to access the interface, the one or more programs utilize the interface to send and display data to the user, via the interface. The data displayed to the user is mock data, predefined data or default data. A user viewing mock data will be able to view certain aspects of graphical user interface (GUI), in order to view a display (e.g., page) in a manner that simulates a view of a user that has access. A user with access, however, would view the actual data. Thus, by generating a GUI (e.g., a page) populated with mock data, the one or more programs provide the user with useable information regarding the application without compromising the security of application itself. In some embodiments of the present invention, the one or more programs may display certain of the application data in the interface as an alert to the user.

Another advantage of some embodiments of the present invention is that the one or more programs generate a user interface that enables a user to control his or her access request with granularity. Utilizing the interface, the user can customize and/or refine (e.g., view/navigate/update) a security policy displayed, along with the (mock) application data in the interface. One or more programs in an embodiment of the present invention transmit to the target application, the access permission request, based on the granular manipulations of the user. Thus, the user can configure and request a customized security policy for use in a request to the target application (and/or a control system that manages access to the target application) for permission.

Embodiments of the present invention also may assist users in evaluating whether they require the access that was denied. One or more programs, executing on one or more processors, provide the aforementioned mock application data through the generated interface and based on this information, the user may determine whether to pursue certain permissions to the application. When operating in a new environment or in a new role, a user may erroneously seek permissions to applications that the user does not require, based on the role of the user. By providing this information upfront, the amount of incorrect permission requests can be minimized.

Figure 1:
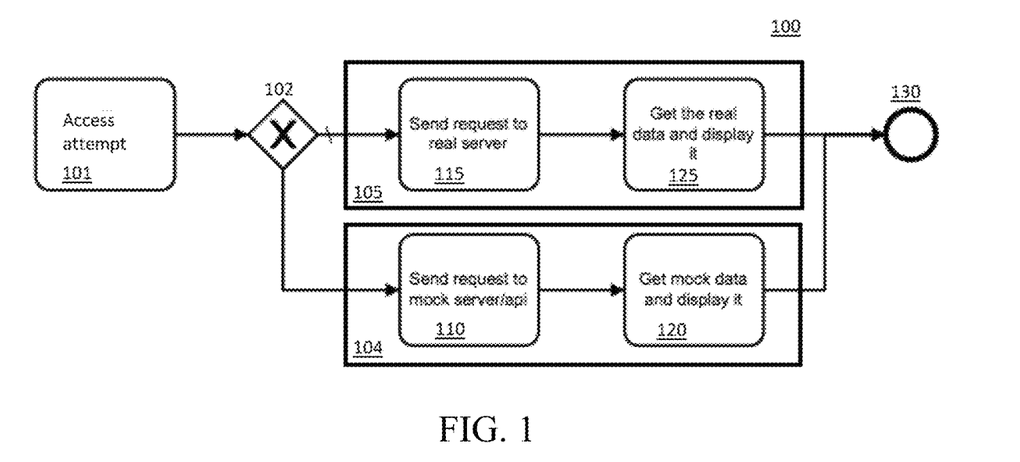
FIG. 1 is a workflow illustrating certain aspects of an embodiment of the present invention.

FIG. 1 illustrates a first workflow 100 of certain aspects of some embodiments of the present invention. In an embodiment of the present invention, a process attempts to access a target application (101). This authorization attempt is denied (102). The regular workflow 105, which would proceed after a successful authorization attempt, does not proceed. After a successful authorization attempt, the process sends data to a real server (115) and would attain and display real data (125), and based on the interaction with the real data, and any updates made through the interaction with the real data are sent to the application service (130).

The word "real" is used in the context of FIG. 1 to describe direct interaction with a target application, which is possible for an authorized user. As the regular workflow 105 for an authorized user is prevented by the authorization failure (102), the alternate workflow 104 is initiated, based on aspects of some embodiments of the present invention. Based on the authorization failure, one or more programs in an embodiment of the present invention generate an interface, thus the request from the process is received by a mock server/API (110). Based on this interaction with the interface, the process can obtain mock data, which the one or more programs display the data in the interface (120). One or more programs of the present invention export data based on the accesses to the mock data (e.g., requested permissions), to the application service for use in accessing the target application (130).

In some embodiments of the present invention the one or more programs are a helper plugin, which enable a user to select access to a system that the user is initially not authorized to access. When the one or more programs determine that a user/process is attempting (requesting) to access an application that is not authorized (101), the one or more programs (e.g., the helper plugin) replace the original endpoint (e.g., an API) with a mock endpoint (e.g., another API) (110), so the request for access returns mock data, rather than fail. Utilizing the mock data (e.g., predefined data or default data), the one or more programs display one or more pages of the requested application, populated with the mock data (120). Thus, the one or more programs simulate pages of the requested application, but with mock data, instead of real application data (120).

In some embodiments of the present invention, after an authorization failure (102), the one or more programs determine if a mock interface (e.g., API endpoint) was previously generated. If there is no mock interface for the given application that the user was attempting to access, the one or more programs dynamically generate a mock interface, for example, on a server of a shared computing environment (e.g., a cloud computing environment) before routing the request to the mock interface (110). The one or more programs may generate the mock interface as a background process, so the user is unaware of this aspect while utilizing a computing node.

By interacting with the mock interface, the user may obtain permission to the target application to which this user was refused access, initially. The user may utilize the mock interface to configure an access request to access the target system. At the conclusion of the user's session in the mock interface, the one or more programs export data from the session (e.g., an access list) to an application service to apply in configuring access parameters for the user, to the target application (130).

Figure 2:
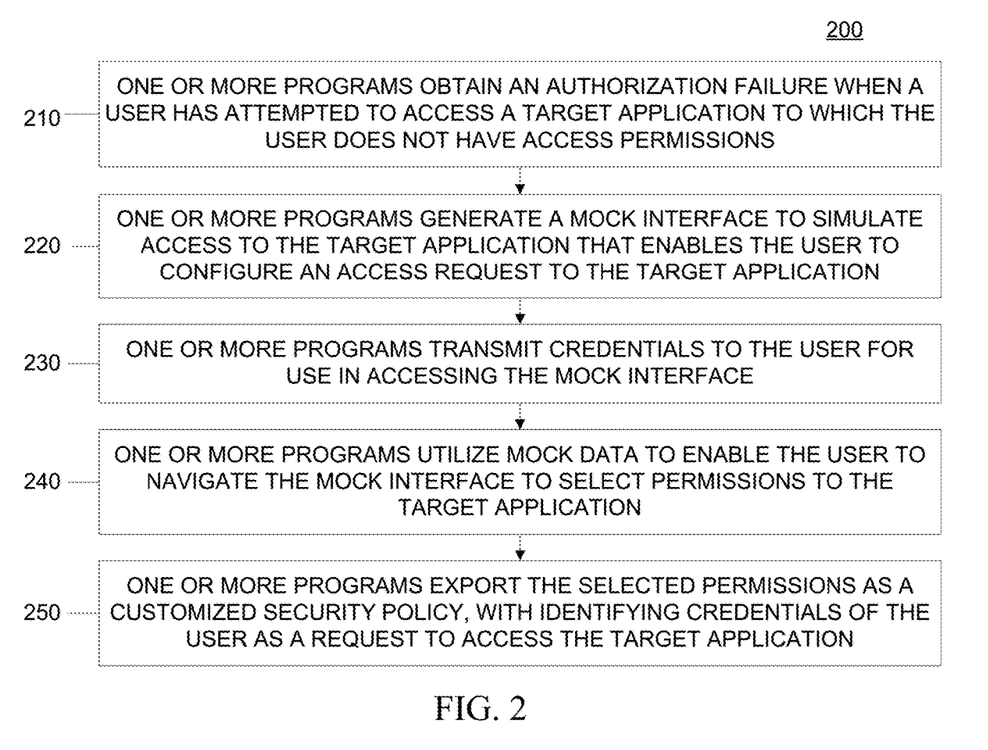
FIG. 2 is a workflow illustrating certain aspects of an embodiment of the present invention.

FIG. 2 is a workflow 200 that illustrates certain aspects of the functionality of the helper plugin in some embodiments of the present invention. In some embodiments of the present invention, one or more programs (executed by one or more processors) obtain an authorization failure when a user has attempted to access a target application to which the user does not have access permissions (210). The user may not have any access to the target application, or the user may not access to a certain area of the application and has made a request beyond the scope of his or her permission. Thus, the authorization failure may be the result of an initial access of the application, by the user, or of the user attempting to complete an activity or access an area within the application that the user is not authorized to complete or access.

The one or more programs generate a mock interface to simulate access to the target application that enables the user to configure an access request to the target application (220). In some embodiments of the present invention, the simulated interface is a mock version of the administrative area of the target application. The appearance is (virtually) the same as the administrative area of the target application, but the user cannot view data that the user is not authorized to view; the one or more programs populate the administrative area with mock data (i.e., predefined data or default data selected, by the one or more programs, simulate a view of a user with access to the real data).

Figure 3:
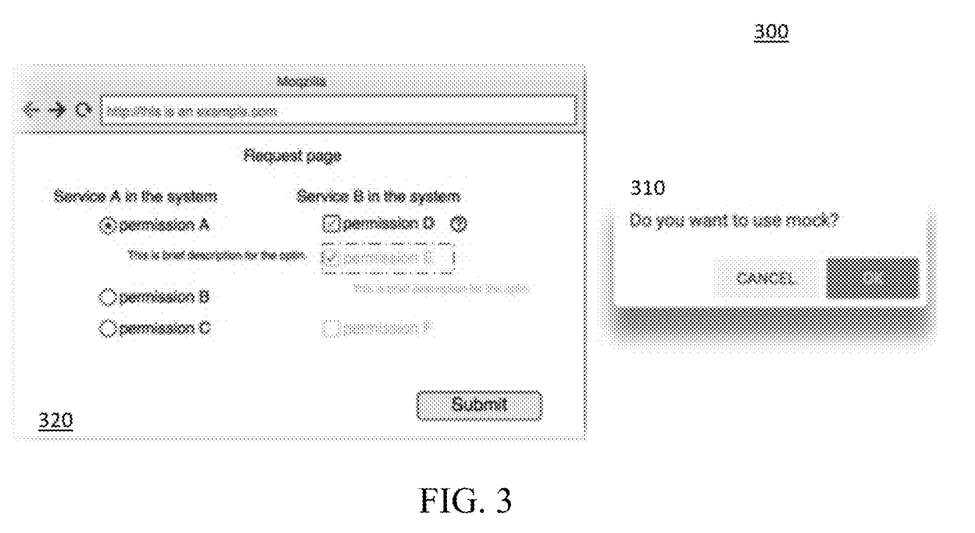
FIG. 3 is an illustration of certain aspects of an embodiment of the present invention.

FIG. 3 is an example of a page 320 in a GUI 300 that a user may view when he or she attempts to access an application to which he or she does not have proper authorization to access the entirety of the application data required to fulfill the request for access. On the page 320 generated by the one or more programs, the one or more programs display a list of permissions to the user, noting that the user does not have "permission E" or "permission F" in Service B. The one or more programs may prompt 310 the user regarding whether the user would like to view mock data related to a permission item for which the user does not have access. The user may select a permission item (e.g., permission E) for which the user does not have permissions, and request mock data related to this permission, by responding to the prompt 310.

Returning to FIG. 2, in some embodiments of the present invention, the one or more programs transmit credentials to the user for use in accessing the mock interface (230). The credentials may be a temporary identifier. Based on obtaining the credentials in the mock interface, the one or more programs utilize mock data (i.e., predefined data or default data selected, by the one or more programs, simulate a view of a user with access to the real data) to enable the user to navigate the mock interface to select permissions to the target application (240). If the user has some access to the target application, the display viewed by a user may display real application data to the user on some pages and/or portions or pages on the interface.

Figure 4:
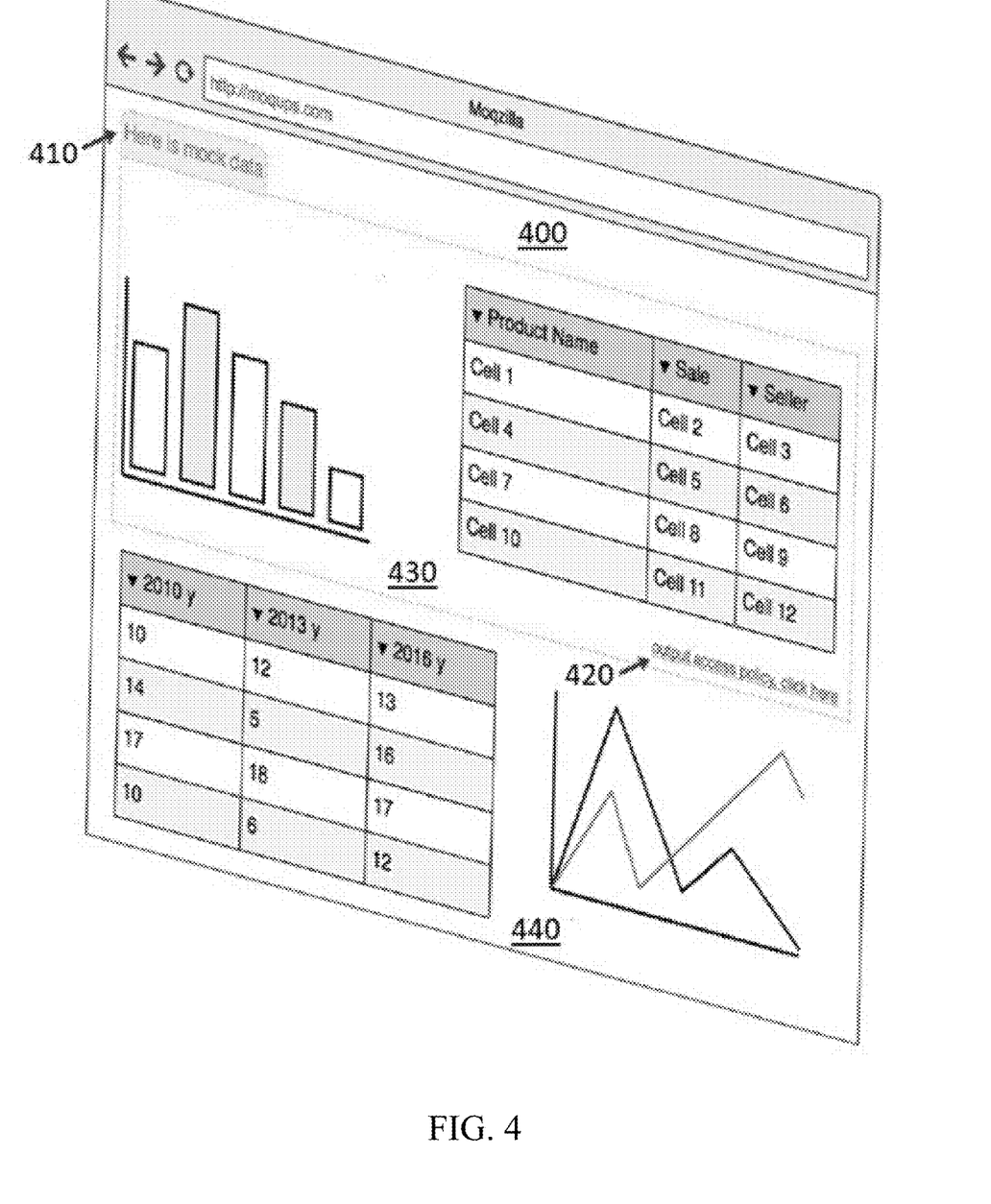
FIG. 4 is an an example of a view (generated by the one or more programs in some embodiments of the present invention) of a screen that appears to be a screen of an application which a user was unauthorized to access, either in part or full.
Figure 5:
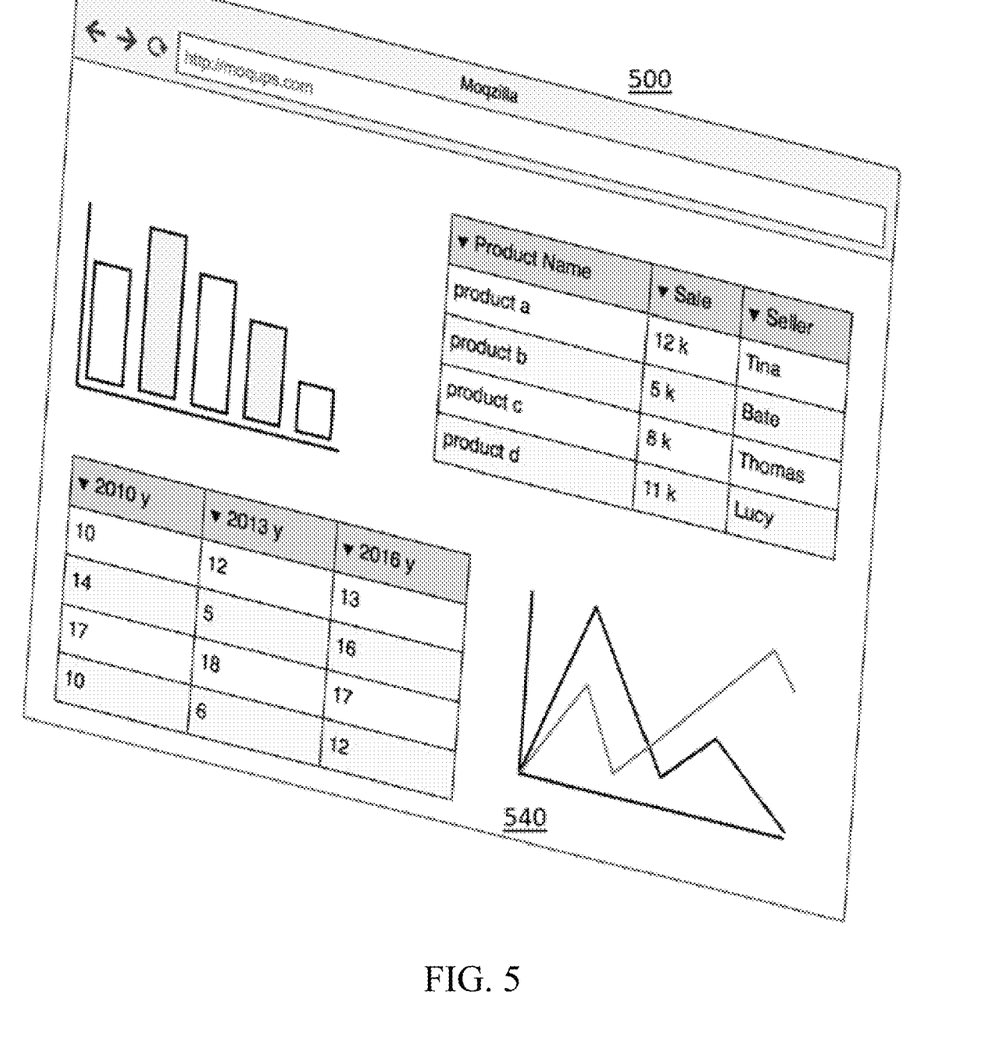
FIG. 5 is a view of the application screen of FIG. 4, when displayed to a user who has access to the application.

FIG. 4 is an example of a view (generated by the one or more programs) of a screen that appears to be a screen 400 of the application which the user was unauthorized to access, either in part or fully. FIG. 5 is a view of the same application screen 500, when displayed to a user, who has access to the application, so no mock interface or mock data is utilized.

In the FIG. 4, certain data of an application is accessible to the user the user's current access level, while certain data is not accessible to the user. One or more programs, in an embodiment of the present invention, display the mock data 430 (i.e., predefined data or default data selected to simulate a view of a user with access to the real data) and the accessible real data 440, in a GUI 400 identical to a GUI of the target application (e.g., FIG. 5, 500). The one or more programs (visually) tag 410 the mock data 430 as such, to distinguish it from the real data 440. For display to the user, the one or more programs provide the mock data 430 from a mock server or through a mock API. For display to the user, the one or more programs provide the real data 440 from the target application's server or thorough an API of the target application.

In FIG. 5, in place of mock data being displayed on a portion of the page, real data 540 is displayed to the user, because the user has permission to access the entirety of the data populating the page 500. The user of FIG. 5 made a request of the application that was sent (e.g., utilizing an API), to the server of the target application (e.g., FIG. 1, 115), and the one or more programs display data 540 retrieved from the target application (e.g., FIG. 1, 125).

Returning to FIG. 4, the one or more programs may provide the user, through the interface, with an administrative view of the different types of access available to the target application, so that the user can select the type of access he or she desires. In the situation where a user views both data 440 and mock data 430, the user may select a portion of the page that includes only mock data and request permission to this data when utilizing the target application. For example, the user may select an option 420 to output an access policy that would include access to the real data, in place of the mock data 430.

Returning to FIG. 2, the one or more programs export the selected permissions as a customized security policy, with identifying credentials of the user (e.g., login, profile data), as a request to access the target application (250). As illustrated in FIG. 4, a user can trigger this export by selected the option 420. Thus, based on obtaining selection of this option 420 through the GUI 400, the one or more programs export data from the session (e.g., an access list) to an application service to apply in configuring access parameters for the user, to the target application (e.g., FIG. 1, 130; FIG. 2, 250). In some embodiments of the present invention, after the user completes attempting API access, the one or more programs, which comprise a plugin, export the user's access list and send the list to an access application service to apply this access list (e.g., policy) to the target application.

The request may be received by a control application (which can be the target application itself), which processes the request and sends a notification once processing is complete finished. Once the processing has successfully completed, a user can login and access the application (or portion of the application that the user could not access prior). In an enterprise system where a user has a single logon to reach all applications, the user can utilize his or her regular login information, but will now have access to the target application that he or she did not have to before this request was processed. In some embodiments of the present invention, one or more programs, upon receiving input regarding permissions via the interface, automatically implements changes to the permissions associated with the profile of the user.

In some embodiments of the present invention, rather than exporting a security policy to a control system, the one or more programs obtain the exported selected permission and generate a security policy based on the permissions. The one or more programs apply the security policy. The one or more programs notify the user of the update. Subsequent to the update, the user can access the target application under the security policy.

Figure 6:
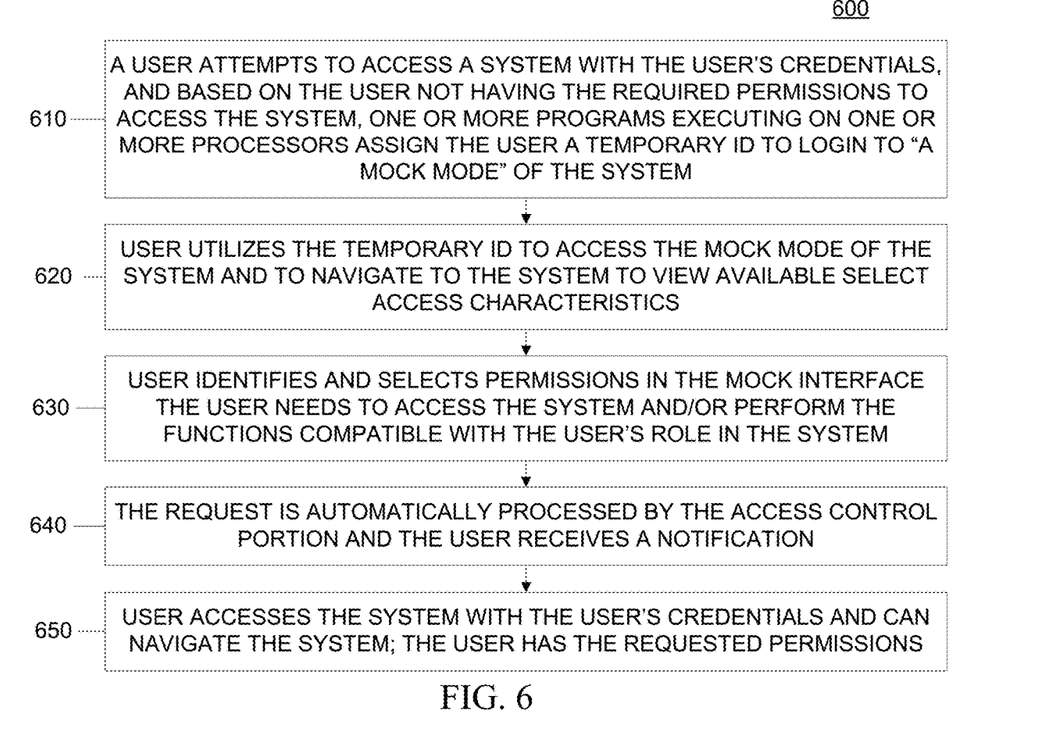
FIG. 6 is a workflow illustrating certain aspects of an embodiment of the present invention.

FIG. 6 is a workflow 600, primarily presented from the point of view of a user in order to illustrate the user experience of various aspects of some embodiments of the present invention. In an embodiment of the present invention, a user attempts to access a system with the user's credentials, and based on the user not having the required permissions to access the system, one or more programs executing on one or more processors assign the user a temporary ID to login to "a mock mode" of the system (i.e., the mock interface generated by the one or more programs with the mock data) (610). The user utilizes the temporary ID to access the mock mode of the system and to navigate to the system to view available select access characteristics (620). The access level of the user to the mock interface may be considered an "administrative" level, as the user can navigate pages of the mock interface and select permissions. The user identifies and selects permissions in the mock interface the user needs to access the system and/or perform the functions compatible with the user's role in the system (630). Utilizing an option in the mock interface, the user exports the selected permissions (e.g., access setting(s)) as a customized security policy, which the one or more programs of an embodiment of the present invention automatically send, with user identifying information (e.g., credentials, user profile, username, etc.) as an access request to the access control portion of the system. The request is automatically processed by the access control portion and the user receives a notification (640). The user accesses the system with the user's credentials and can navigate the system; the user has the requested permissions (650).

Embodiments of the present invention include a computer-implemented method, a computer program product, and a computer system in which one or more programs obtain an authorization failure from a target application, where the authorization failure indicates that an access request to the target application was denied based on insufficient permissions of a user associated with the request. The one or more programs institute a mock interface, where a visual appearance of the mock interface simulates a visual appearance of the target application, where the mock interface displays predefined data and the target application displays dynamic data, from one or more server executing the target application. The one or more programs obtain, via the mock interface, a request to change the permissions of the user to the target application, where the request comprises a selection, by the user, through the mock interface, of one or more individual permissions displayed in the mock interface. The one or more programs automatically generate a customized security policy comprising the selection, where based on applying the customized security policy, repeating the access request results in authorized access to the target application.

In some embodiments of the present invention, the one or more programs also transmit the customized security policy to a control system of the target application, wherein the customized security policy is automatically applied to update the permissions of a user to the target application. The one or more programs notify the user of the update.

In some embodiments of the present invention, the one or more programs also apply the customized security policy to a control system of the target application to update the permissions of a user to the target application. The one or more programs notify the user of the update.

In some embodiments of the present invention, the one or more programs, when instituting the mock interface, generate temporary credentials for use by the user in accessing the mock interface. The one or more programs transmit the temporary credentials to the user. The one or more programs authorize access by the user to the mock interface based on obtaining the temporary credentials from the user via an entry by the user in the mock interface.

In some embodiments of the present invention, the one or more programs, when instituting the mock interface, generate the mock interface.

In some embodiments of the present invention, the target application is executed by a first server and the mock interface is executed by a second server.

In some embodiments of the present invention, the mock interface is selected from the group consisting of: a simulated service, a helper plugin and an application programming interface.

In some embodiments of the present invention, the request to change the permissions of the user to the target application includes the one or more programs identifying credentials of the user.

In some embodiments of the present invention, the one or more programs instituting the mock interface also includes the one or more programs intercepting a denial of access from the target application. The one or more programs replace the denial of access with a display of the permissions of the user to the target application by the mock interface.

In some embodiments of the present invention, the one or more programs instituting the mock interface includes the one or more programs prompt, via the mock interface, the user to request mock data to view aspects of the target application, simulated by the mock interface, for which the user possesses insufficient permissions to view in the target application.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resource(s), including the processors that execute the one or more programs that generate the mock interface and the control system of the application can be understood as part of one or more cloud computing nodes 10 (FIG. 7) and if not examples of portions of a cloud computing node 10, then a portion of one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
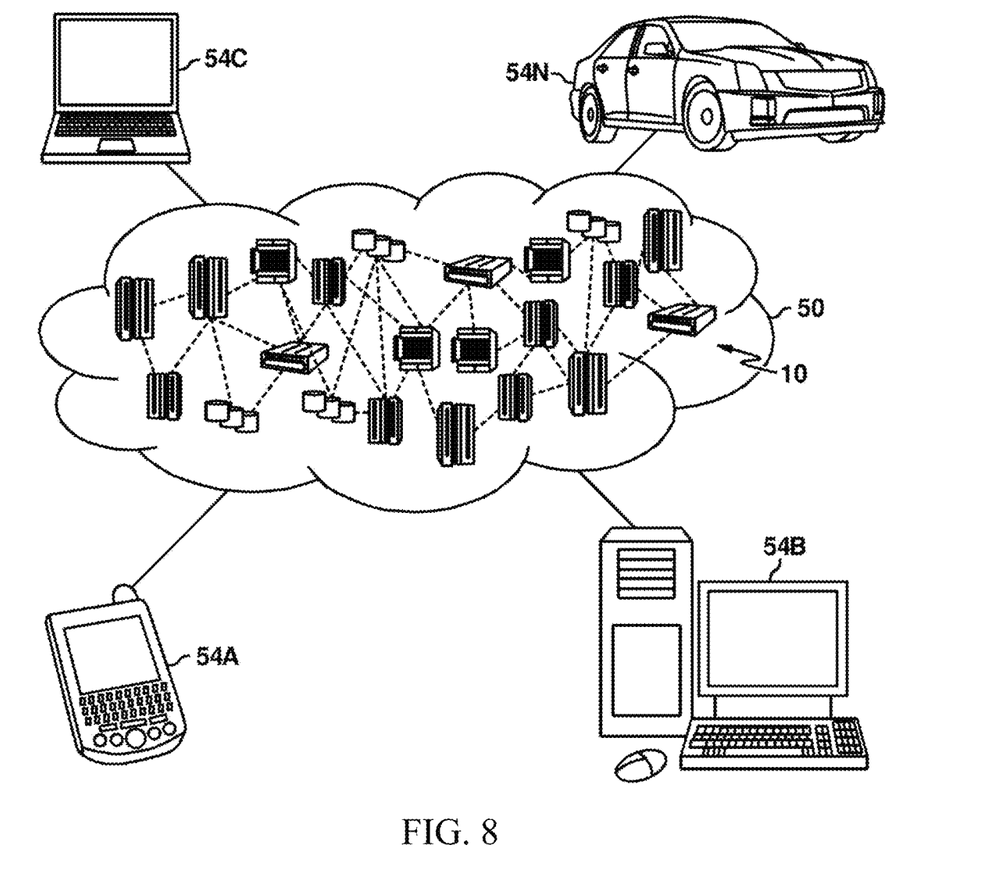
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
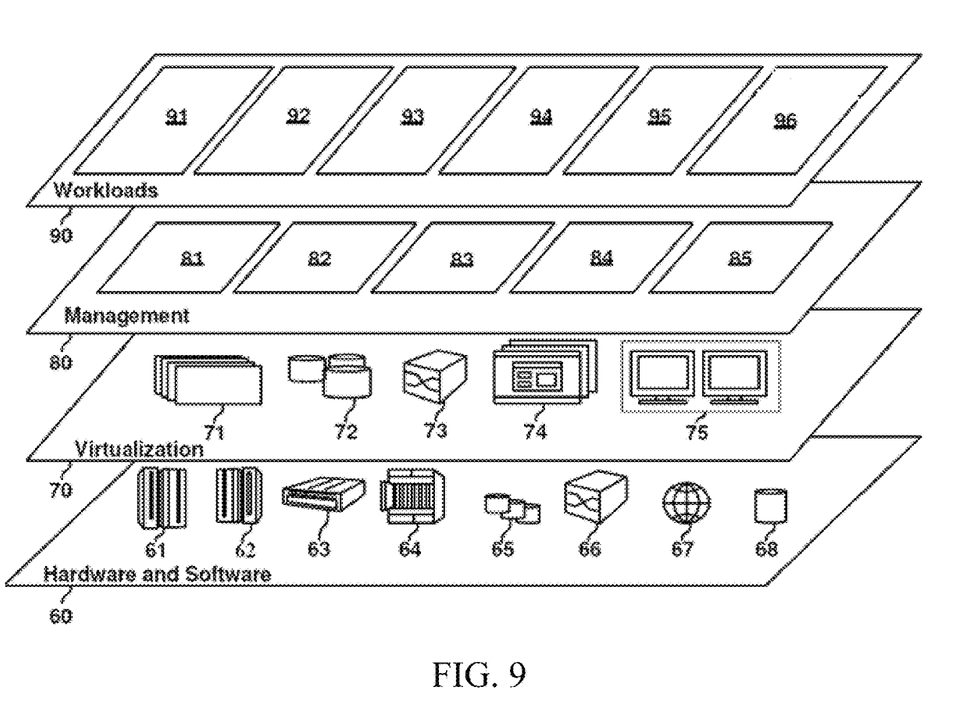
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a mock interface for permission navigation and selection by a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
a non-transitory computer readable storage medium readable by one or more processors of a first computing node and storing instructions for execution by the one or more processors for performing a method comprising:

transmitting, by the one or more processors of the first computing node, instructions to a second computing node to display on a display of the second computing node, a first graphical user interface, the first computing node comprising a host computing system and the second computing node comprising a client computing system;

obtaining, by the one or more processors, via the first graphical user interface, an initial authorization request from the second computing node to a target application;

denying, by one or more processors, the initial authorization request from the second computing node, the initial authorization request obtained via the first graphical user interface, to the target application based on determining, by the one or more processors, that a user associated with the initial authorization request has insufficient permissions to access a dynamic data from one or more data sources served by the target application, based on the denying, generating, by the one or more processors, a mock interface comprising a second graphical user interface, wherein the mock interface is an application programming interface to the target application, transmitting, by the one or more processors, instructions to the second computing node to display a second graphical user interface, wherein the second graphical user interface is a user interface to the mock interface, wherein a visual appearance of the second graphical user interface is visually similar to a visual appearance of the first graphical user interface, wherein displaying the second graphical user interface comprises displaying predefined data provided to the second graphical user interface by the mock interface, the predefined data comprising a portion of a static set of data that does not include the dynamic data from the one or more data sources, wherein the displaying the predefined data comprises displaying, in the second graphical user interface, a list of permissions of the user to the target application and options to select one or more additional permissions;

obtaining, by the one or more processors, via the second graphical user interface, a user selection of one or more of the options;

based on the obtaining, transmitting, by the one or more processors, to the second computing node, instructions to display a larger portion of the static set of data in the second graphical user interface, wherein the instructions comprise an instruction that the displaying the larger portion of the data comprises simulating in the second graphical user interface a visual appearance of the first graphical user interface as displayed to a user of the target application with permissions to the target application, the permissions comprising the user selected one or more options;

automatically transmitting, by the one or more processors, via the mock interface, the user selected one or more options, to the target application, a request to change the permissions of the user associated with the initial authorization request to the target application, wherein the request to change the permissions comprises a request for permissions to the target application represented by the selected one or more options;

receiving, by the one or more processors, from the target application, responsive to the automatically transmitting, a customized security policy comprising the selected one or more options;

applying, by the one or more processors, the customized security policy to a control system of the target application to update the permissions of the user associated with the initial authorization request to the target application;

approving, by the one or more processors, a subsequent authorization request from the second computing node to the target application based on the updated permissions, wherein the subsequent authorization request is submitted through the first graphical user; and based on the approving, transmitting, by the one or more processors, instructions to the second computing node to display in the first graphical user interface, the dynamic data from the one or more data sources.

2. The computer program product of claim 1, the method further comprising: transmitting, by the one or more processors, to the second computing node a notification.

3. The computer program product of claim 1, wherein generating the mock interface further comprises: generating, by the one or more processors, temporary credentials for use by the user associated with the initial authorization request in accessing the mock interface; transmitting, by the one or more processors, the temporary credentials to the user associated with the initial authorization request; obtaining, by the one or more processors, via an entry by the user associated with the initial authorization request in the second user interface, the temporary credentials; and authorizing, by the one or more processors, access by the user associated with the initial authorization request to the mock interface based on obtaining the temporary credentials.

4. A host computing system comprising:
a memory; one or more processors in communication with the memory; program instructions executable by the one or more processors, via the memory to perform a method, the method comprising:

transmitting, by the one or more processors of the first computing node, instructions to a second computing node to display on a display of the second computing node, a first graphical user interface, the first computing node comprising a host computing system and the second computing node comprising a client computing system;

obtaining, by the one or more processors, via the first graphical user interface, an initial authorization request from the second computing node to a target application;

denying, by one or more processors, the initial authorization request from the second computing node, the initial authorization request obtained via the first graphical user interface, to the target application based on determining, by the one or more processors, that a user associated with the initial authorization request has insufficient permissions to access a dynamic data from one or more data sources served by the target application, based on the denying, generating, by the one or more processors, a mock interface comprising a second graphical user interface, wherein the mock interface is an application programming interface to the target application, transmitting, by the one or more processors, instructions to the second computing node to display a second graphical user interface, wherein the second graphical user interface is a user interface to the mock interface, wherein a visual appearance of the second graphical user interface is visually similar to a visual appearance of the first graphical user interface, wherein displaying the second graphical user interface comprises displaying predefined data provided to the second graphical user interface by the mock interface, the predefined data comprising a portion of a static set of data that does not include the dynamic data from the one or more data sources, wherein the displaying the predefined data comprises displaying, in the second graphical user interface, a list of permissions of the user to the target application and options to select one or more additional permissions;

obtaining, by the one or more processors, via the second graphical user interface, a user selection of one or more of the options;

based on the obtaining, transmitting, by the one or more processors, to the second computing node, instructions to display a larger portion of the static set of data in the second graphical user interface, wherein the instructions comprise an instruction that the displaying the larger portion of the data comprises simulating in the second graphical user interface a visual appearance of the first graphical user interface as displayed to a user of the target application with permissions to the target application, the permissions comprising the user selected one or more options;

automatically transmitting, by the one or more processors, via the mock interface, the user selected one or more options, to the target application, a request to change the permissions of the user associated with the initial authorization request to the target application, wherein the request to change the permissions comprises a request for permissions to the target application represented by the selected one or more options;

receiving, by the one or more processors, from the target application, responsive to the automatically transmitting, a customized security policy comprising the selected one or more options;

applying, by the one or more processors, the customized security policy to a control system of the target application to update the permissions of the user associated with the initial authorization request to the target application;

approving, by the one or more processors, a subsequent authorization request from the second computing node to the target application based on the updated permissions, wherein the subsequent authorization request is submitted through the first graphical user; and based on the approving, transmitting, by the one or more processors, instructions to the second computing node to display in the first graphical user interface, the dynamic data from the one or more data sources.

* * * * *